United States Patent
Wang et al.

(10) Patent No.: US 11,643,103 B2
(45) Date of Patent: May 9, 2023

(54) NAVIGATION CONSIDERING ROUTE DRIVING DIFFICULTY

(71) Applicant: GM GLOBAL TECHNOLOGY OPERATIONS LLC, Detroit, MI (US)

(72) Inventors: Hui-ping Wang, Troy, MI (US); Li Zuo, Troy, MI (US); Sanja Laptosevic, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/031,058

(22) Filed: Sep. 24, 2020

(65) Prior Publication Data

US 2022/0089177 A1    Mar. 24, 2022

(51) Int. Cl.
*B60W 60/00* (2020.01)
*G01C 21/36* (2006.01)
*G01C 21/34* (2006.01)
*B60W 40/105* (2012.01)

(52) U.S. Cl.
CPC ........ *B60W 60/001* (2020.02); *B60W 40/105* (2013.01); *G01C 21/3461* (2013.01); *G01C 21/3492* (2013.01); *G01C 21/3605* (2013.01); *G01C 21/3691* (2013.01); *B60W 2520/00* (2013.01); *B60W 2552/10* (2020.02); *B60W 2554/406* (2020.02)

(58) Field of Classification Search
CPC combination set(s) only.
See application file for complete search history.

(56) References Cited

U.S. PATENT DOCUMENTS

| | | | | |
|---|---|---|---|---|
| 10,317,241 B2* | 6/2019 | Olsen | ................. | G01C 21/3697 |
| 10,324,463 B1* | 6/2019 | Konrardy | ............. | G05D 1/0278 |
| 10,699,347 B1* | 6/2020 | Slusar | ................ | G01C 21/3461 |
| 11,112,794 B2* | 9/2021 | Chi-Johnston | ..... | G01C 21/3461 |
| 2003/0033080 A1* | 2/2003 | Monde | ............... | G01C 21/3641 701/425 |
| 2007/0050133 A1* | 3/2007 | Yoshikawa | ........ | G01C 21/3461 701/437 |
| 2008/0033643 A1* | 2/2008 | Shimizu | ............. | G01C 21/3461 701/533 |
| 2009/0312942 A1* | 12/2009 | Froeberg | ............ | G01C 21/3461 701/532 |
| 2010/0030464 A1* | 2/2010 | Mittermaier | ....... | G01C 21/3461 701/533 |
| 2012/0191343 A1* | 7/2012 | Haleem | ................ | G08G 1/0969 701/431 |
| 2012/0245833 A1* | 9/2012 | Zaitsu | .................... | G08G 1/163 701/117 |

(Continued)

*Primary Examiner* — Jeff A Burke
*Assistant Examiner* — Madison B Emmett
(74) *Attorney, Agent, or Firm* — Lorenz & Kopf, LLP

(57) ABSTRACT

In accordance with an exemplary embodiment, a method is provided that includes: receiving an input as to a destination of travel for a vehicle; identifying, via a processor, a plurality of routes for the vehicle to travel to the destination; determining, via the processor, for each of the plurality of routes, a measure of difficulty of vehicle maneuvers for the vehicle to reach the destination via the route; and performing a vehicle action, via instructions provided by the processor, based on the respective measures of difficulty for the plurality of routes.

11 Claims, 7 Drawing Sheets

(56) References Cited

U.S. PATENT DOCUMENTS

| | | | |
|---|---|---|---|
| 2012/0259541 A1* | 10/2012 | Downey | G01C 21/20 |
| | | | 701/433 |
| 2016/0305787 A1* | 10/2016 | Sato | G08G 1/096844 |
| 2018/0004211 A1* | 1/2018 | Grimm | G05D 1/0214 |
| 2018/0058875 A1* | 3/2018 | Wan | G01C 21/3641 |
| 2018/0059687 A1* | 3/2018 | Hayes | G08G 1/202 |
| 2018/0238697 A1* | 8/2018 | Maru | G01C 21/3461 |
| 2019/0017840 A1* | 1/2019 | Okamoto | G01C 21/3629 |
| 2020/0356100 A1* | 11/2020 | Nagarajan | G01C 21/3602 |
| 2022/0187083 A1* | 6/2022 | Cohen | G01C 21/3461 |
| 2023/0005068 A1* | 1/2023 | Kumar | G06Q 10/047 |

* cited by examiner

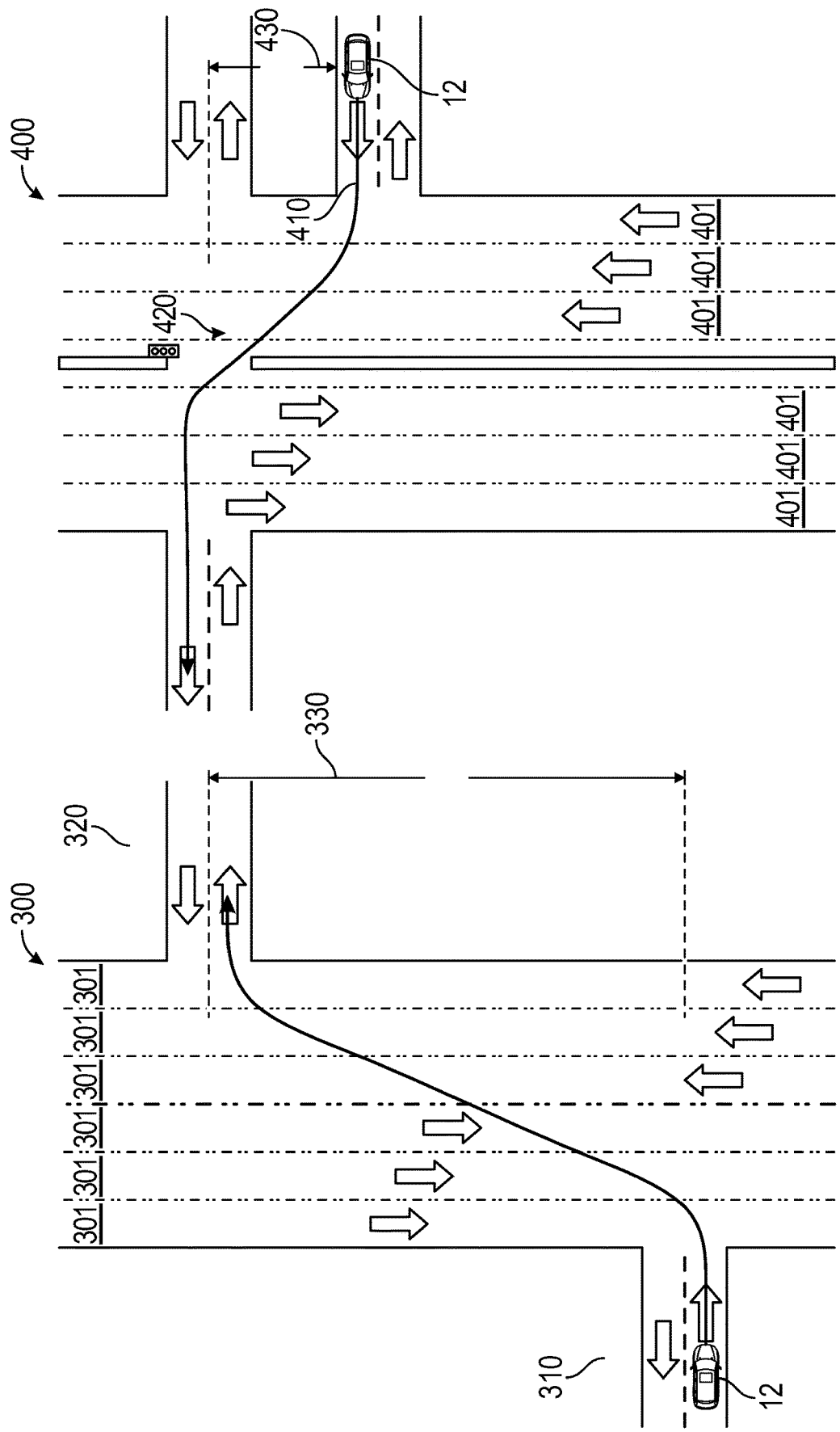

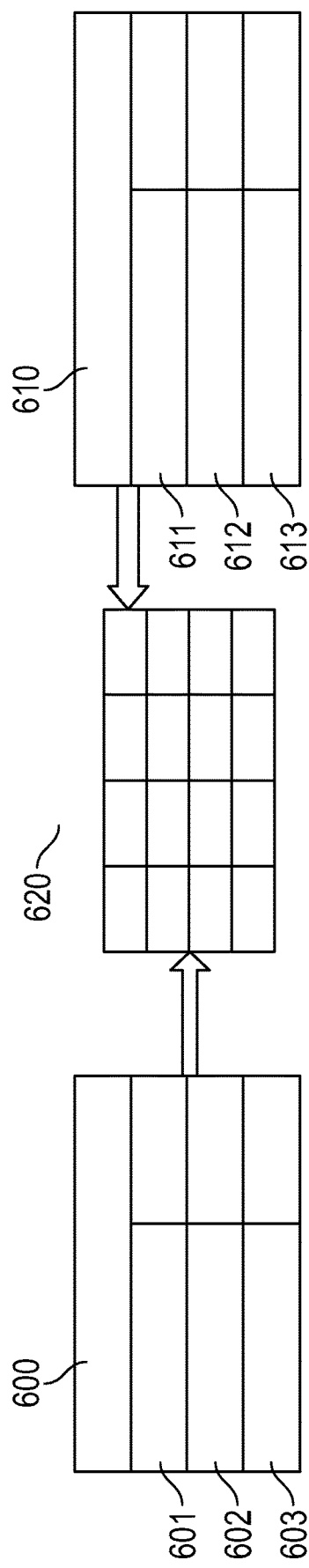
FIG. 6
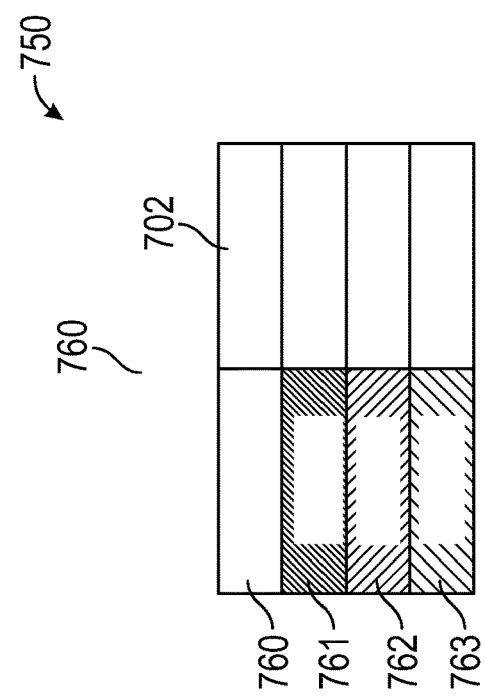
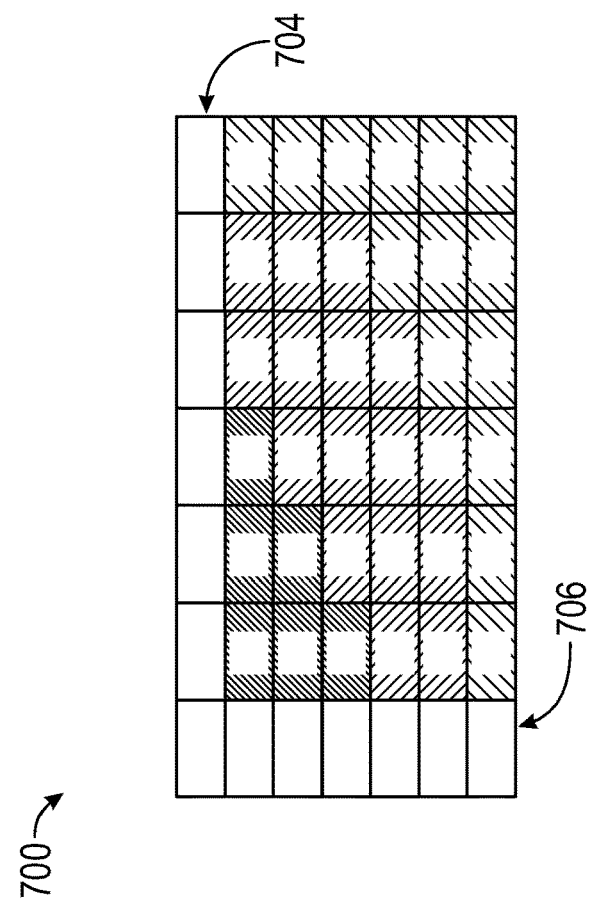
FIG. 7

NAVIGATION CONSIDERING ROUTE DRIVING DIFFICULTY

TECHNICAL FIELD

The technical field generally relates to vehicles, and more particularly relates to navigation systems for vehicles.

Many vehicles today include navigation systems that provide potential routes for a vehicle to travel in order to reach a destination. While such routes are typically analyzed with respect to certain factors, such as time and distance to travel to the destination, this may not always incorporate all of the user's preferences and capabilities.

Accordingly, it may be desirable to provide improved methods and systems for providing navigation systems for vehicles, including analysis of potential travel routes to a desired destination. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided that includes: receiving an input as to a destination of travel for a vehicle; identifying, via a processor, a plurality of routes for the vehicle to travel to the destination; determining, via the processor, for each of the plurality of routes, a measure of difficulty of vehicle maneuvers for the vehicle to reach the destination via the route; and performing a vehicle action, via instructions provided by the processor, based on the respective measures of difficulty for the plurality of routes.

Also in an exemplary embodiment, for each of route of the plurality of routes, the step of determining the measure of difficulty is based on a number of lanes per distance of travel along the route to reach the destination.

Also in an exemplary embodiment, for each of route of the plurality of routes, the step of determining the measure of difficulty is also based on a traffic and speed condition for the route, based on a function of traffic congested level, speed limit, and current vehicle speed.

Also in an exemplary embodiment, for each of route of the plurality of routes, the step of determining the measure of difficulty is also based on a road surface condition for the route.

Also in an exemplary embodiment, the method further includes: receiving a second input as to a desired tolerance for difficulty level for travelling of the vehicle; wherein the step of performing the vehicle action, via instructions provided by the processor, is based on the desired tolerance for difficulty level as well as the respective measures of difficulty for the plurality of routes.

Also in an exemplary embodiment, the step of taking the vehicle action includes providing a listing of the plurality of routes, along with information as to their respective measures of difficulty.

Also in an exemplary embodiment, the vehicle includes an autonomous vehicle; and the step of taking the vehicle action includes automatically operating the autonomous vehicle, via instructions provided by the processor, to travel to the destination.

In accordance with another exemplary embodiment, a system is provided that includes: an input device configured to receive an input as to a destination of travel for a vehicle; and a processor coupled to the input device and configured to at least facilitate: identifying a plurality of routes for the vehicle to travel to the destination; determining, for each of the plurality of routes, a measure of difficulty of vehicle maneuvers for the vehicle to reach the destination via the route; and providing instructions for performing a vehicle action, based on the respective measures of difficulty for the plurality of routes.

Also in an exemplary embodiment, the processor is configured, for each of route of the plurality of routes, to determine the measure of difficulty based on a number of lanes per distance of travel along the route to reach the destination.

Also in an exemplary embodiment, the processor is configured, for each of route of the plurality of routes, to determine the measure of difficulty also based on a traffic and speed condition for the route, based on a function of traffic congested level, speed limit, and current vehicle speed.

Also in an exemplary embodiment, the processor is configured, for each of route of the plurality of routes, to determine the measure of difficulty also based on a road surface condition for the route.

Also in an exemplary embodiment, the input device is further configured to receive a second input as to a desired tolerance for difficulty level for travelling of the vehicle; and the processor is further configured to provide instructions to perform the vehicle action based on the desired tolerance for difficulty level as well as the respective measures of difficulty for the plurality of routes.

In another exemplary embodiment, a vehicle is provided that includes: a drive system; and a navigation system coupled to the drive system, the navigation system including: an input device configured to receive an input as to a destination of travel for a vehicle; and a processor coupled to the input device and configured to at least facilitate: identifying a plurality of routes for the vehicle to travel to the destination; determining, for each of the plurality of routes, a measure of difficulty of vehicle maneuvers for the vehicle to reach the destination via the route; and providing instructions for performing a vehicle action, based on the respective measures of difficulty for the plurality of routes.

Also in an exemplary embodiment, the processor is configured, for each of route of the plurality of routes, to determine the measure of difficulty based on a number of lanes per distance of travel along the route to reach the destination.

Also in an exemplary embodiment, the processor is configured, for each of route of the plurality of routes, to determine the measure of difficulty based on a number of lanes per distance of travel along the route to reach the destination.

Also in an exemplary embodiment, the processor is configured, for each of route of the plurality of routes, to determine the measure of difficulty also based on a traffic and speed condition for the route, based on a function of traffic congested level, speed limit, and current vehicle speed.

Also in an exemplary embodiment, the processor is configured, for each of route of the plurality of routes, to determine the measure of difficulty also based on a road surface condition for the route.

Also in an exemplary embodiment, the input device is further configured to receive a second input as to a desired tolerance for difficulty level for travelling of the vehicle; and the processor is further configured to provide instructions to perform the vehicle action based on the desired tolerance for difficulty level as well as the respective measures of difficulty for the plurality of routes.

Also in an exemplary embodiment, the processor is further configured to provide a listing of the plurality of routes, along with information as to their respective measures of difficulty.

Also in an exemplary embodiment, the vehicle includes an autonomous vehicle; and the processor is further configured to provide instructions for automatically operating the autonomous vehicle to travel to the destination.

DESCRIPTION OF THE DRAWINGS

The present disclosure will hereinafter be described in conjunction with the following drawing figures, wherein like numerals denote like elements, and wherein:

FIGS. 3-5, 8, and 9 depict exemplary driving maneuvers and associated routes that may be implemented in connection with the communication system of FIG. 1, including the vehicle of FIG. 1, and the process of FIG. 2, in accordance with exemplary embodiments; and FIGS. 6 and 7 depict exemplary table that may be utilized in connection with implementing the process of FIG. 2 in connection with the communication system of FIG. 1, including the vehicle of FIG. 1, and including the exemplary driving maneuvers and associated routes of FIGS. 3-5, 8, and 9, in accordance with exemplary embodiments.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
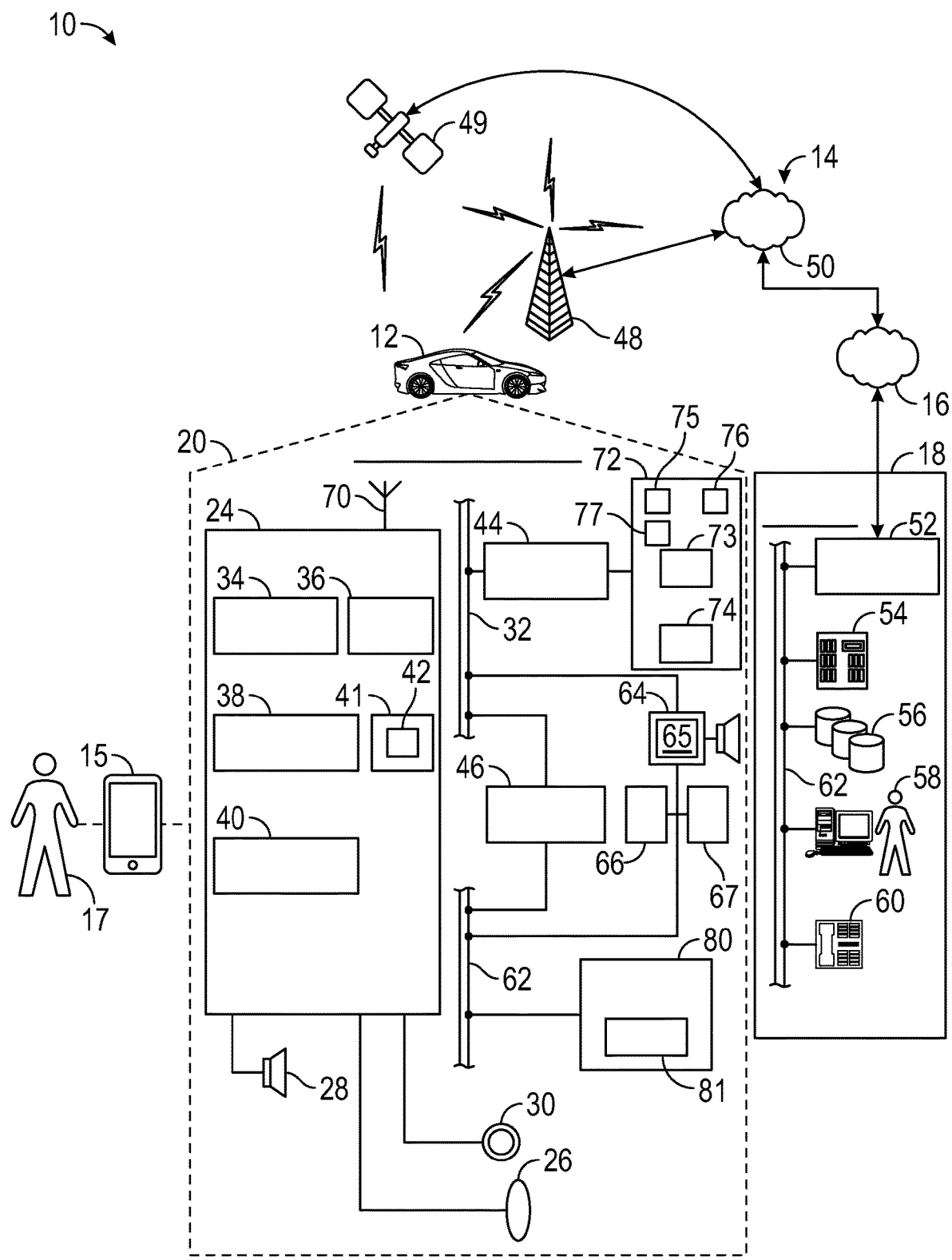
FIG. 1 is a functional block diagram of a communications system that includes a vehicle, and that is configured to provide navigation functionality for the vehicle that analyzes potential routes of travel to a destination based on a difficulty of one or more driving maneuvers associated with the route.

FIG. 1 is a functional block diagram of a communications system 10, in accordance with an exemplary embodiment. As described in greater detail further below, the communications system 10 includes a vehicle 12. Also as described in greater detail further below, the communications system 10 is configured to provide navigation functionality for the vehicle 12 that analyzes potential routes of travel to a destination based on a difficulty of one or more driving maneuvers associated with the route, in accordance with exemplary embodiments. As depicted in FIG. 1, the communications system 10 generally includes the above-referenced vehicle 12, along with one or more wireless carrier systems 14, one or more land networks 16, and one or more remote servers 18.

It should be appreciated that the overall architecture, setup and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

In various embodiments, each vehicle 12 may be any type of mobile vehicle such as a motorcycle, car, truck, recreational vehicle (RV), boat, plane, farm equipment, or the like, and is equipped with suitable hardware and software that enables it to communicate over communications system 10. As shown in FIG. 1, in various embodiments the vehicle hardware 20 is disposed within a body of the vehicles 12, and includes a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides navigation functionality for one or more users 17 of the vehicle 12, and in certain embodiments additional services as well, through its communication with the remote server 18, and generally includes an electronic processing device (processor) 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

In various embodiments, the telematics unit 24 can be embedded/installed within the vehicles 12 at the time of manufacture, or may be an aftermarket unit that is installed after manufacture of the vehicles 12. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicles 12 and one or more other network devices, for example using one or more wireless protocols such as one or more IEEE 802.11 protocols, WiMAX, or Bluetooth.

The telematics unit 24 may offer a number of different services for users 17 of the vehicles 12, including the connection and communication with the electronic device(s) 15 of users 17 of the vehicle 12, and to provide navigation functionality for the vehicle 12 that analyzes potential routes of travel to a destination based on a difficulty of one or more driving maneuvers associated with the route. In various embodiments, the electronic device 15 may include a mobile phone, such as a smart phone. In certain other embodiments, the device 15 may include, by way of example, various other different consumer electronic/mobile devices, such as a keyfob, a laptop, a smart wearable device, a tablet computer, a network computer, and/or one or more other electronic devices and/or combinations thereof.

In various embodiments, the telematics unit 24 detects and communicates with the electronic device 15 while connected to a wireless network within a wireless range of the vehicles 12. In various embodiments, the telematics unit 24 and each electronic device 15 exchange data (either directly and/or indirectly via the remote server 18), including the exchange of an identifier of the electronic device 15, such as a media access control (MAC) address for a mobile phone. Also in various embodiments, the telematics unit 24 retrieves, from the electronic device 15 (and/or one or more other input devices for the vehicle 12) inputs from the user 17 as to a desired destination of travel for the vehicle 12, as well as (in certain embodiments) a desired tolerance for difficulty of maneuvers associated with routes of travel for reaching the destination, and plans routes for travel of the vehicle 12 in accordance with these inputs, and based also on different levels of difficulty of driving maneuvers of different available routes to reach the desired destination of travel, for example as set forth in greater detail below in connection with the process 200 of FIG. 2 and in connection with supporting FIGS. 3-9.

In addition, in various embodiments, the telematics unit 24 may also provide other services, such as, by way of example: turn-by-turn directions and other navigation-related services provided in conjunction with the GPS chipset/component 42, emergency assistance services, information requests from the users of the vehicles 12 (e.g., regarding points of interest en route while the vehicle 12 is travelling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

In certain embodiments, the telematics unit 24 similarly utilizes a visual component 66 for providing visual information for the user, for example including map views, route options, and related details for the user, as part of or in conjunction with the navigation system 41, via one or more display screens 67.

Vehicle sensors 72, connected to various sensor interface modules 44 are operatively connected to the vehicle bus 32. In various embodiments, the vehicle sensors 72 include detection sensors 73, user input sensors 74, speed sensors 75, visibility sensors 76, and road condition sensors 77, described below. In various embodiments, the vehicle sensors 72 may also include any number of other sensors, such as by way of example, accelerometers, steering angle sensors, braking system sensors, gyroscopes, magnetometers, emission detection, and/or control sensors, and the like. Example sensor interface modules 44 include powertrain control, climate control, and body control, to name but a few.

In various embodiments, the detection sensors 73 detect and communicate with the user 17's electronic device 15. For example, in various embodiments, the detection sensors 73 detect the electronic device 15 and receive a unique identifier thereof (e.g., a MAC address of a mobile phone) in order to help identify the user 17 of the vehicles 12. In certain embodiments, the detection sensors 73 include one or more Bluetooth low energy (BLE) sensors 73 that are disposed within or on the vehicles 12 (e.g., on or within the body of the vehicles 12). In certain embodiments, the detection sensors 73 are utilized in connection with one or more short-range wireless connection (SRWC) protocols (e.g., Bluetooth/Bluetooth Low Energy, or Wi-Fi).

Also in various embodiments, the input sensors 74 are utilized to detect inputs from the user 17 with respect to navigation of the vehicle 12, and in certain embodiments also with respect to operation of various vehicle components. For example, in various embodiments, the input sensors 74 detect requests by the user 17 as to a requested destination of travel for the vehicle 12, and in certain embodiments also as to a preference and/or threshold as to difficulty of maneuvers for travel of the vehicle 12. In various embodiments, the input sensors 74 also may be part of and/or coupled to one or more of the hardware components 20 and/or controls 30, and/or to one or more other vehicle modules 80, such as one or more vehicle control modules 81, body control modules, engine control modules, and/or other modules that control different functionality for the vehicles 12.

In various embodiments, the speed sensors 75 measure a speed of the vehicle 12 (e.g., via one or more wheel speed sensors) and/or measure one or more parameters that may be used to calculate the vehicle speed (e.g., via an accelerometer of the vehicle 12). In addition, in various embodiments, the visibility sensors 76 measure one or more parameters that affect visibility on the road, such as, by way of example, rain, snow, sleet, frost, and the like. Also in various embodiments, the road condition sensors 77 measure one or more parameters that affect tire grip on the road (e.g., a coefficient of friction of the roadway).

The wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicles 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The modem or other telecommunication/computer equipment 60 may include an encoder, as previously explained, and can be connected to various devices such as a server 54 and database 56. In various embodiments, the database 56 of the remote server 18 comprises a computer memory that stores the identifiers (e.g., MAC addresses) for the respective electronic devices 15 of the various users 17 that utilize the vehicle 12, along with map data and/or other data pertaining to navigation for the vehicle 12. Although the illustrated example has been described as it would be used in conjunction with a remote server 18 that is manned, it will be appreciated that the remote server 18 can be any central or remote facility, manned or unmanned, mobile or fixed, to or from which it is desirable to exchange voice and data.

Figure 2:
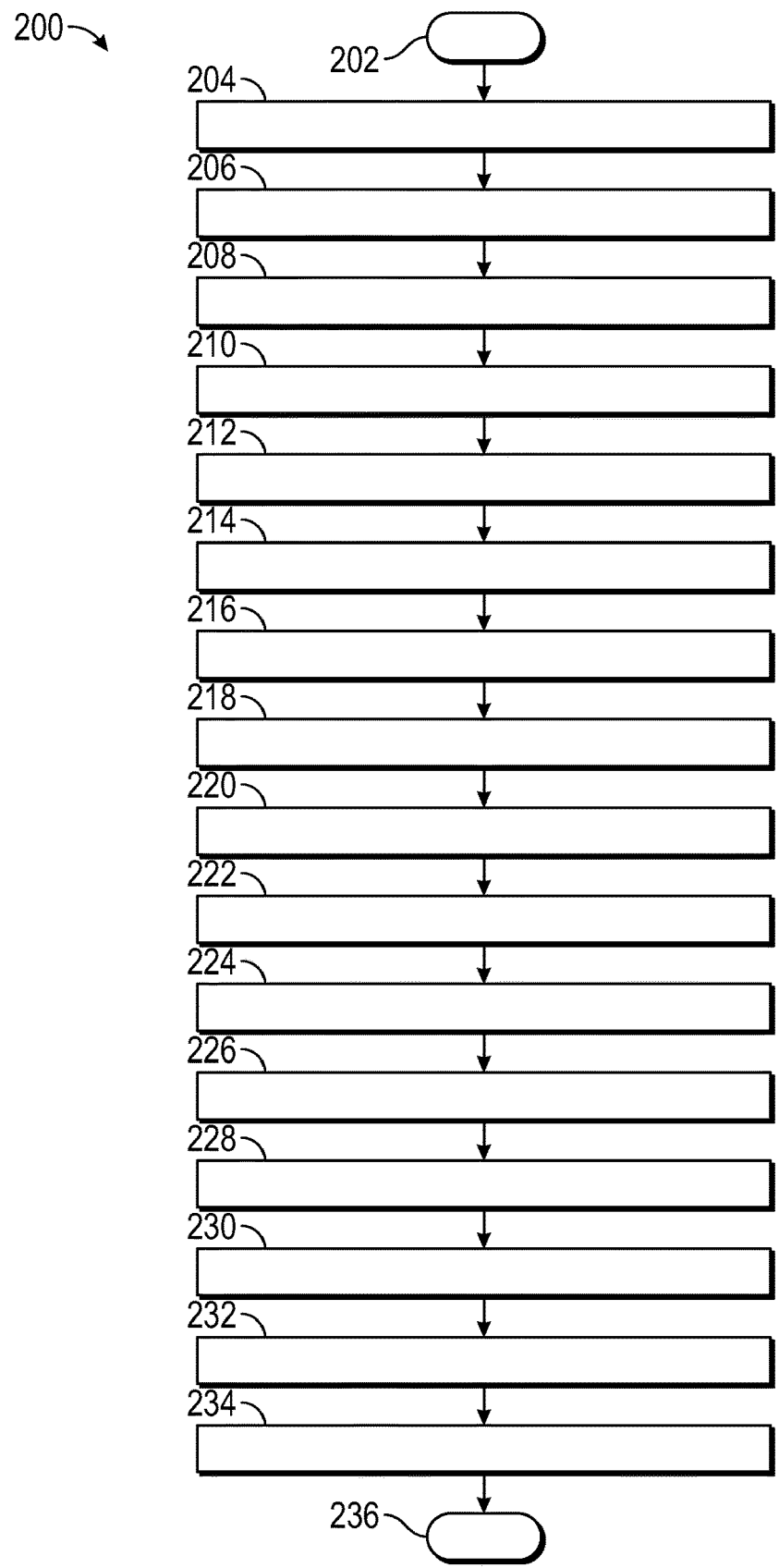
FIG. 2 is a flowchart of a process to provide navigation functionality for the vehicle that analyzes potential routes of travel to a destination based on a difficulty of one or more driving maneuvers associated with the route, and that can be used in connection with the communications system of FIG. 1, including the vehicle thereof of FIG. 1, in accordance with exemplary embodiments.

FIG. 2 is a flowchart of a process 200 for providing navigation functionality for the vehicle that analyzes potential routes of travel to a destination based on a difficulty of one or more driving maneuvers associated with the route, in accordance with exemplary embodiments. The process 200 can be used in connection with the communications system 10 of FIG. 1, including the vehicle 12 thereof of FIG. 1, in accordance with exemplary embodiments. The process 200 will also be described further below in connection with (i) FIGS. 3-5, 8, and 9, which depict exemplary driving maneuvers and associated routes that may be implemented in connection with the process 200 and the communications system 10, including the vehicle 12 thereof, of FIG. 1; and (ii) FIGS. 6 and 7, which depict exemplary tables that may be utilized in connection with implementing the process 200 of FIG. 2 in connection with the communication system of FIG. 1, including the vehicle of FIG. 1, and including the exemplary driving maneuvers and associated routes of FIGS. 3-5, 8, and 9, in accordance with exemplary embodiments.

As depicted in FIG. 2, in various embodiments the process 200 begins at step 202. In certain embodiments, the process 200 begins when one or more users 17 (e.g., drivers or passengers) of the vehicle 12 approaches or enters the vehicle 12, or turns on the vehicle 12 and/or an ignition therefor (e.g. by turning a key, engaging a keyfob or start button, and so on), or turns on or engages a navigation feature of the vehicle 12. In certain embodiments, the steps of the process 200 are performed continuously during operation of the vehicle 12.

In various embodiments, user inputs are obtained at 204. In various embodiments, the user inputs include (i) a destination for travel of the vehicle 12; and (ii) a user's preference as to a tolerance and/or threshold for difficulty of maneuvers for routes that may be used in order to reach the desired destination. In certain embodiments, the user inputs are received via one or more detection units and/or systems, such as the detection sensors 73 and/or the user device 15 of FIG. 1. In various embodiments, the user's destination is determined at 206, and the user's preferences (e.g., as to threshold for difficulty of maneuvers for routes to the destination) are determined at 208, namely by the processor 38 of FIG. 1 based on the user inputs of 204.

Also in various embodiments, vehicle sensor data is obtained at 210. In various embodiments, vehicle sensor data is obtained from various vehicle sensors 72 of FIG. 1. For example, in certain embodiments, the sensor data includes information and data as to a speed of the vehicle 12 (e.g., as measured by speed sensors 75); road conditions and/or visibility (e.g., as measured by visibility sensors 76), and/or other sensor data pertaining to the vehicle 12 and/or pertaining to a roadway on which the vehicle 12 is travelling.

Also in various embodiments, map data is obtained at 212. In various embodiments, the map data pertains to maps stored in a computer memory (e.g., memory 40 of the vehicle 12 and/or databases 56 of the remote server 18) pertaining to a roadway on which the vehicle 12 is travelling, and pertaining to roadways for various possible routes that the vehicle 12 may take en route to the destination.

Also in various embodiments, third party data is obtained at 214. In various embodiments, third party data is obtained from the remote server 18, and/or one or more other sources outside the vehicle 12 (e.g., a weather service, a traffic service, and so on) as to one or more conditions (e.g., traffic congestion, traffic speed, rain, wind, snow, and/or other weather, and so on) of or surrounding the roadway (e.g., on which the vehicle 12 is travelling and roadways for various possible routes that the vehicle 12 may take en route to the destination.

An identification is made at 216 as to possible routes that the vehicle 12 may take to reach the destination. In various embodiments, the processor 38 of FIG. 1 identifies possible routes to the destination based on the map data obtained at step 212.

Also in various embodiments, for each of the possible routes, traffic and speed conditions (TSC) are determined at 218. In various embodiments, the traffic and speed conditions (TSC) are determined by the processor 38 as a function of traffic congested level (TC), speed limit (SL), and current vehicle speed (CVS) for the vehicle 12. Also in various embodiments, assuming that there are (n+1) turns in the entire route with starting point counted as the first turn and with the end point as the (n+1)-th turn, the roadway between the i-th turn and the i+1-th turn may be referred to as Section i. In various embodiments, the traffic and speed condition is defined as following:

$$TSC_i = f_1(TC_i(loc), SL_i(loc), CVS_i(loc)) \text{ for } i=1,2,\ldots n \quad \text{(Equation 1)}.$$

Also in various embodiments, the value $TSC_i$ may vary within Section i, and may need to break into smaller sections for optimal evaluation of traffic and speed condition, in certain embodiments and circumstances. In addition, in certain embodiments, $TSC_i$ can be categorized into different condition levels. For example, in one embodiment, $TSC_i$ is categorized into three levels, namely, as: good (1), bad (2), and dangerous (3).

Also in various embodiments, for each of the possible routes, a lane change challenge (LCC) is proposed and defined at 220. In various embodiments, the processor 38 of FIG. 1 proposes and defines the lane change challenge (LCC) as a function of a number of lane changes per distance and its traffic and speed condition (TSC) between neighboring turns.

Figure 5:
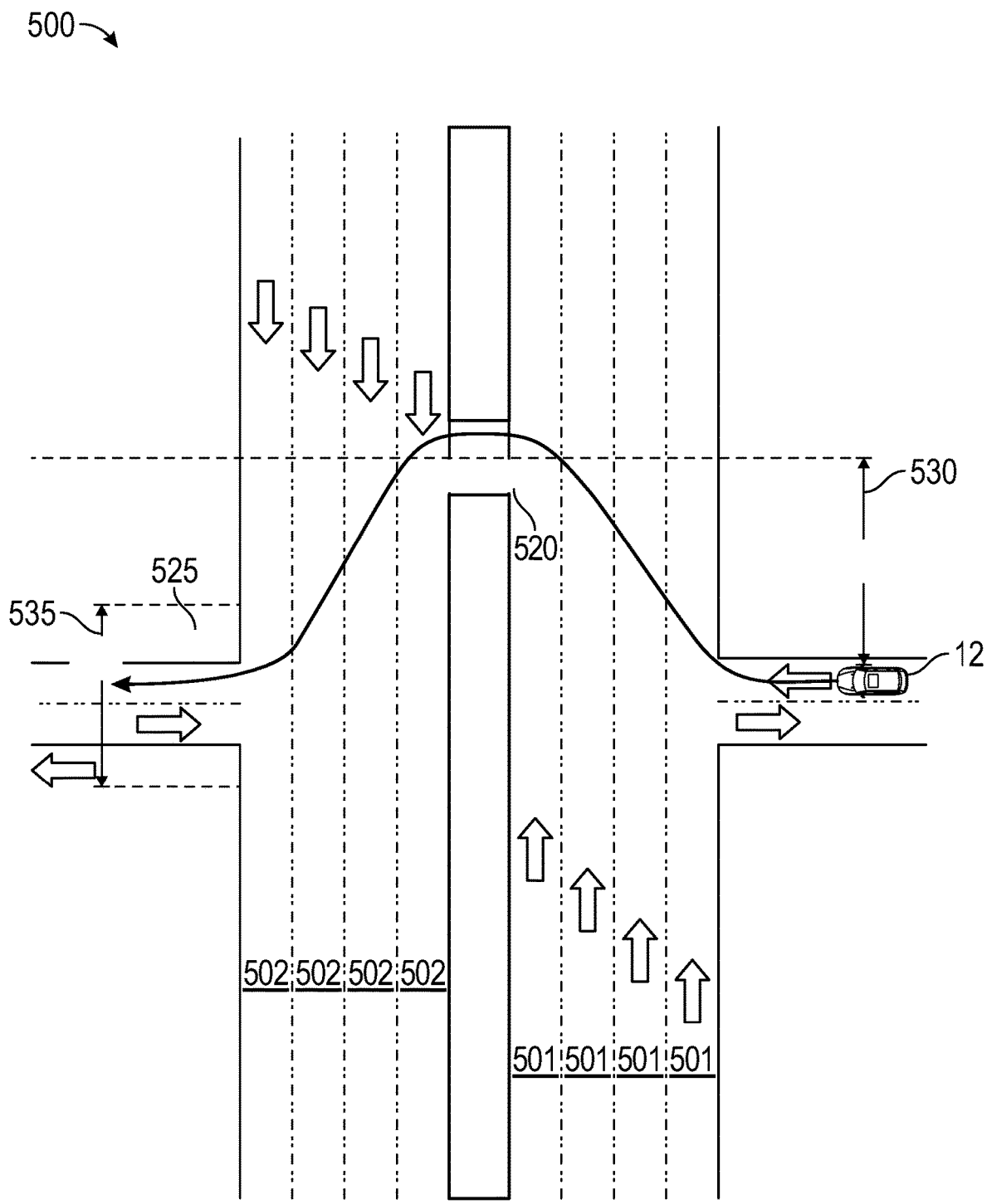

With reference to FIGS. 3-5, exemplary scenarios "A" 300 (FIG. 3), "B" 400 (FIG. 4), and "C" 500 (FIG. 5) are depicted, for the vehicle 12 along a roadway with various lanes. For example, FIG. 4 depicts the vehicle 12 crossing three lanes 401 of traffic between the i-th turn 410 and an i+1-th turn 420, with a distance $d_i$ 430 therebetween. FIG. 3 depicts the vehicle 12 crossing six lanes 301 of traffic between the i-th turn 310 and an i+1-th turn 320, with a distance $d_i$ 330 therebetween. FIG. 5 depicts the vehicle 12 (a) crossing four initial lanes 501 of traffic between the i-th turn 510 and an i+1-th turn 520, with a distance $d_i$ 530 therebetween; and then (b) crossing four additional lanes 502 of traffic between the i+1-th turn 520 and an i+2-th turn 525, with a distance $d_{i+1}$ 535 therebetween.

With reference back to FIG. 2, in various embodiments, assuming that there are (n+1) turns in the entire route with the starting point counted as the first turn and the end point s the (n+1)-th turn, the distance between the i-th turn and the i+1-th turn is $d_1$. Also in various embodiments, the number of lanes needed to cross is $nl_i$.

Also in various embodiments, the lane change challenge (i) is defined as follows:

$$LCC_i = f_2(nl_i/d_i, TSC_i), \text{ for } i=1,2,\ldots,n \quad \text{(Equation 2)}$$

In addition, in various embodiments, the $LCC_i$ can be categorized into different challenge levels. For example, in one embodiment, $LCC_i$ may be categorized into three specific levels, namely, as: easy (1), medium (2), and challenging (3).

In addition, in various embodiments, the road surface condition (RSC) is identified at 222. In various embodiments, the processor 38 of FIG. 1 proposes and defines the road surface condition (RSC) as a function of road conditions (RC) (e.g., including humidity, snow, ice, frost, other weather conditions, and the like, for visibility) as well as friction conditions (FC) (of the roadway) by utilizing one or more road condition sensors 77 of FIG. 1 (e.g., for a tire grip condition).

In various embodiments, assuming there are (n+1) turns in the entire route with the starting point counted as the first turn and the end point as the (n+1)-th turn, the roadway between the i-th turn and the i+1-th turn is Section i, and has a road surface condition (RSC) that is defined as follows:

$$RSC_i = f_3(RC_i(loc), FC_i(loc)) \text{ for } i=1,2,\ldots,n \quad \text{(Equation 3)}.$$

In various embodiments, $RSC_i$ can be characterized into different condition levels. For example, in one embodiment, $RSC_i$ is characterized into three levels; namely: (i) Good, such as dry and clear (1); Bad, such as wet and foggy (2); and Dangerous, such as icy and snowing (3).

In various embodiments, the driving difficulty magnitude (DDM) is identified at 224. In various embodiments, the processor 38 of FIG. 1 proposes and defines the driving difficulty magnitude (DDM) as a function of lane change challenge (LCC) and road surface condition (RSC), in accordance with the following equation:

$$DDM_i = f_4(LCC_i, RSC_i) \quad \text{(Equation 4)}.$$

For example, in various embodiments, if the LCC and the SRC are both categorized into three levels, and the function is a simple multiplication, then $DDM_i$ can be calculated by multiplying the various respective values of $LCC_i$ and $SRC_i$.

For example, with reference to FIG. 6, an illustrative example is provided for the calculation of $DDM_i$ based on the $LCC^i$ and the $RSC_i$, with respect to the examples discussed above with respect to $LCC_i$ and $RSC_i$.

In this example the $LCC_i$ table 600 shows that LCCi can be categorized in three categories; namely: (i) "Easy" (represented as 601 in table 600), having a numerical value of "1" for calculation purposes; (ii) "Medium" (represented as 602 in table 600), having a numerical value of "2" for calculation purposes; and (iii) "Challenge" (represented as 603 in table 600), having a numerical value of "3" for calculation purposes.

Also in this example the $RSC_i$ table 610 shows that $RSC_i$ can be categorized in three categories; namely: (i) "Good" (represented as 611 in table 600), having a numerical value of "1" for calculation purposes; (ii) "Bad" (represented as 612 in table 600), having a numerical value of "2" for calculation purposes; and (iii) "Dangerous" (represented as 613 in table 600), having a numerical value of "3" for calculation purposes.

Also in this example, for any given route (or route segment), the respective values of $LCC_i$ and $RSC_i$ are multiplied together to result in a respective $DDM_i$ value based on the product of the multiplication, as shown in the $DDM_i$ table 620. Accordingly, when the $LCC_i$ is "Easy" and the $RSC_i$ is "Good", the resulting $DDM_i$ value will be 1×1=1, and so on.

In various embodiments, for each route, the driving difficulty magnitudes (DDM) from each of the segments of the route are then aggregated together in 226 in order obtain an aggregate $DDM_r$ value for the particular route. The aggregate $DDM_r$ value for the route is then utilized to ascertain a "driving difficulty level" (DDL) value for the route. Also in various embodiments, this is repeated for each of the plurality of routes that may be selected for reaching the destination.

In various embodiments, during 226, the processor 38 of FIG. 1 proposes and defines the driving difficulty level (DDL) based on the entire route aggregate driving difficulty magnitude (DDM$_r$), which is a function of DDM$_i$ for i=1, 2, . . . , n. In various embodiments, DDL is utilized for communication with drivers or passengers of the vehicle 12 regarding route driving difficulty.

In various embodiments, the aggregate driving difficulty magnitude (DDM$_r$) for the route is expressed as follows:

$$DDM_r = f_5(DDM_i, \text{ for } i=1,2, \ldots, n) \quad \text{(Equation 5).}$$

By way of example, in an exemplary embodiment, f$_5$ may comprise a simple additional of DDM$_i$. For example, in one example in which there are three turns and two sections of road in the entire route, the possible DDM values would be calculated accordingly, and the DDL levels would be categorized into three levels, namely: Easy, Medium, and Difficult.

For example, with reference to FIG. 7, table 700 depicts the route DDM$_r$ 702 as being calculated as the sum of the various DDM$_i$ values for the different route segments (i). Specifically, in this example in which there are two segments in the route, the route DDM$_r$ 702 is calculated as the sum of DDM$_1$ 704 and DDM$_2$ 706, as shown in table 700 of FIG. 1.

With further reference to FIG. 7, table 750 depicts the driving difficulty level (DDL) 760 for a particular route based on the route DDM 702 for the particular route. As shown in FIG. 7, in this example, the DDL 760 for the particular route is categorized as either (A) "Easy" (represented as 761 in table 760); (B) "Medium" (represented as 762 in table 760); or (C) "Difficult" (represented as 763 in table 760). Specifically, in this example, the DDL is categorized as (A) "Easy" if the DDM$_r$ value for the route is in the range of 1-4; (B) "Medium" if the DDM$_r$ value for the route is in the range of 5-9; and (C) "Difficult" if the DDM$_r$ value for the route is in the range of 10-18.

In various embodiments, the routes are sorted at 228. In various embodiments, the processor 38 of FIG. 1 sorts the various routes based on the driving difficulty level (DDL) for each route along with the user inputs from the user from 204, 208 as to the user preferences pertaining to the difficulty of driving maneuvers for the routes. For example, if the driver (or user or passenger) has expressed a preference for only "Easy" routes, then "Easy" routes will be prioritized first, even if such routes may take significantly more time and/or distance for other routes. By way of additional example, if the driver (or user or passenger) expresses a willingness to accept "Medium" routes, then such "Medium" routes may be prioritized first if such routes correspond to significantly less time and/or distance as compared with other "Easy" routes, and so on.

Figure 8:
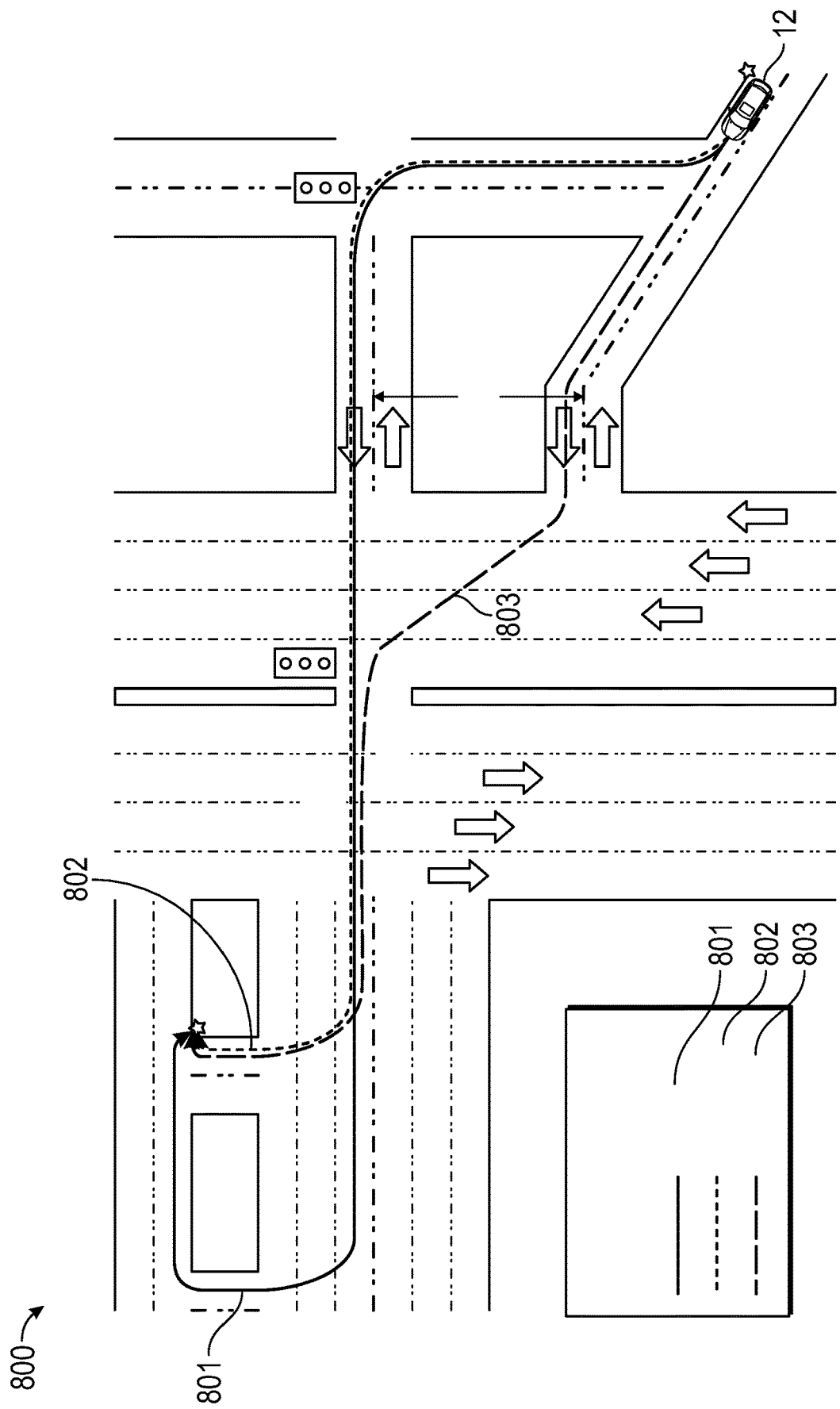

With reference to FIG. 8, an exemplary illustration 800 is provided, showing three alternate routes for the vehicle 12 along a roadway. Specifically, a first route 801 is categorized as "Easy", whereas a second route 802 is categorized as "Medium", and a third route 803 is categorized as "Difficult". In certain embodiments, each of the different potential routes 801, 802, 803 are displayed as options for the user (e.g., driver or passenger), along with an indication of the level of difficulty. For example, in one embodiment, an "Easy" route may be depicted in a first color (e.g., green), whereas a "Medium" route may be depicted in a second color (e.g., blue), and a "Difficult" route may be depicted in a third color (e.g., red), for example on the display screen 67 of FIG. 1. In addition, in certain other embodiments, one of these routes may be pre-selected for the user based on the user's previously entered preferences as to what level of difficulty is deemed acceptable by the user.

In various embodiments, output is provided at 230 for a user of the vehicle (e.g., for a driver or a passenger of the vehicle). In various embodiments, a map of potential routes is provided, along with an indication of the driving difficulty level (DDL) associated with each route. For example, in certain embodiments, the different routes are provided in different colors associated with different DDL values (e.g., Easy, Medium, and Difficult), as described above in connection with FIG. 8. In various embodiments, this information is provided for the user on the display screen 67 of FIG. 1, in accordance with instructions provided by the processor 38 of FIG. 1 (e.g., as part of or in conjunction with a navigation system 41 of the vehicle 12).

Also in various embodiments, inputs are then received from user (e.g., a driver or passenger of the vehicle) at 232 as to the selected route (e.g., via input sensors 74 of an input device of the vehicle 12). In various embodiments, one or more vehicle actions are then performed at 234 in accordance with instructions provided by the processor 38 of FIG. 1. For example, in certain embodiments, the vehicle 12 comprises an autonomous vehicle, and the vehicle 12 executes the selected route and automatically travels to the destination along the selected route, while also displaying information regarding the selected route along the way via the display screen 67 of FIG. 1. In other embodiments, the vehicle 12 may not be an autonomous vehicle 12, but still may display the selected route on the display screen 67 of FIG. 1 for the user, along with information as to the DDL, or difficulty, associated with each section of the route, in various embodiments.

Figure 9:
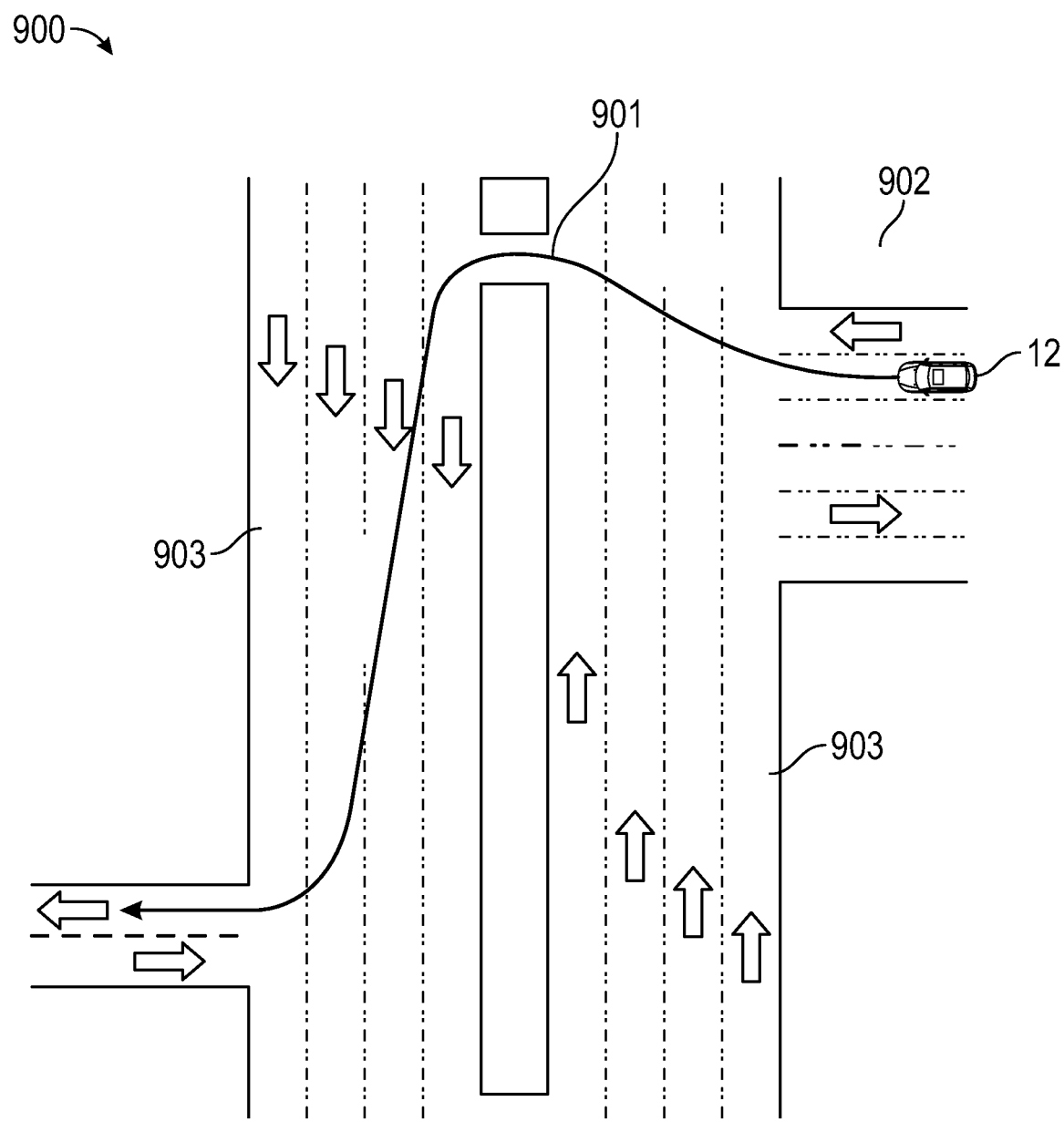

For example, with reference to FIG. 9, an illustration 900 is provided showing the selected route 901 for the vehicle 12 along a roadway that includes certain exemplary roads, namely: (i) Big Beaver Road 902 and (ii) Woodward Road 903. In various embodiments, a map of the selected route 901 is depicted for the user on the display screen 67 of FIG. 1, along with a description of the various steps of the route, accompanied by an indication of the level of difficult of each step (and, in various embodiments, including a description of the number of lanes to be crossed in each particular step).

For example, in one example, the description of the steps may appear alongside the map of the illustration 900, and may include the following text (e.g., to the left of the illustration):

Head west in Big Beaver Road, 3 lanes (Easy)
1 mile
Turn right onto M-1 N/Woodward, 4 lanes (Easy)
0.1 mile
Cross 4 lanes from right to left and make a U-turn on Woodward, 4 lanes (Medium)
2 miles
Cross 4 lanes from left to right and turn right onto 14 miles, 1 lane (Medium)

In certain embodiments, the process then terminates at 236.

Accordingly, in accordance with various embodiments, methods, systems, and vehicles are provided that provide for potentially improved navigation features for a vehicle, that analyze potential routes based on a driving difficulty level associated with the route, in combination with user preferences as to the driving difficulty level.

It will be appreciated that the systems and methods may vary from those depicted in the Figures and described herein. For example, the communications system of FIG. 1, including the remote server, the vehicles, communications networks, and/or components thereof, may vary from that depicted in FIG. 1 and/or described herein, in various embodiments. It will also be appreciated that the process (and/or subprocesses) disclosed herein may differ from those described herein and/or depicted in FIG. 2, and/or that steps thereof may be performed simultaneously and/or in a different order as described herein and/or depicted in FIG. 2, among other possible variations. It will also be appreciated that the various implementations of FIGS. 3-9 and described above may also vary in different embodiments.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:

1. A method comprising:
   receiving an input as to a destination of travel for a vehicle;
   identifying, via a processor, a plurality of routes for the vehicle to travel to the destination;
   for each route of the plurality of routes, dividing the route into a plurality of segments;
   determining, via the processor, for each of the plurality of routes, an aggregate measure of difficulty of vehicle maneuvers for the vehicle to reach the destination via the route, wherein the aggregate measure of difficulty for each route is determined by the processor based on:
   for each of the plurality of segments for the route, a route segment measure of difficulty based on the product of:
   (a) a lane maneuver difficulty based on a number of lane changes per distance travelled on the route to reach the end of the segment; multiplied by (b) a road condition difficulty based on road surface conditions, including weather conditions affecting visibility and a coefficient of friction affecting tire grip; and
   for each route, adding the route segment measure of difficulty for each of the segments of the route, to thereby calculate the aggregate measure of difficulty for the route; and
   performing a vehicle action, via instructions provided by the processor, based on the respective aggregate measures of difficulty for the plurality of routes.

2. The method of claim 1, wherein:
   for each route of the plurality of routes, the step of determining the aggregate measure of difficulty is also based on a traffic and speed condition for the route, based on a function of traffic congested level, speed limit, and current vehicle speed.

3. The method of claim 1, further comprising:
   receiving a second input as to a desired tolerance for difficulty level for travelling of the vehicle;
   wherein the step of performing the vehicle action, via instructions provided by the processor, is based on the desired tolerance for difficulty level as well as the respective aggregate measures of difficulty for the plurality of routes, such that certain routes of the plurality of routes receive higher priority as compared with certain other routes of the plurality of routes when the certain routes have sufficiently lower travel distance or travel time as compared with the certain other routes, even when the certain routes have higher aggregate measures of difficulty as compared with the certain other routes, provided that the aggregate measures of difficulty of the certain routes is within the desired tolerance of a user of the vehicle as reflected via the second input.

4. The method of claim 3, wherein:
   the aggregate measures of difficulty are categorized into three levels of difficulty, namely: easy, medium, and difficult; and
   the second input reflects which the following three levels of difficulty, namely, easy, medium and difficulty, are acceptable to the user.

5. The method of claim 1, wherein the step of taking the vehicle action comprises providing a listing of the plurality of routes, along with information as to their respective measures of difficulty.

6. The method of claim 1, wherein:
   the vehicle comprises an autonomous vehicle; and
   the step of taking the vehicle action comprises automatically operating the autonomous vehicle, via instructions provided by the processor, to travel to the destination.

7. A vehicle comprising:
   a drive system; and
   a navigation system coupled to the drive system, the navigation system comprising:
   an input device configured to receive an input as to a destination of travel for a vehicle; and
   a processor coupled to the input device and configured to at least facilitate:
   identifying a plurality of routes for the vehicle to travel to the destination;
   for each route of the plurality of routes, dividing the route into a plurality of segments;
   determining, for each of the plurality of routes, an aggregate measure of difficulty of vehicle maneuvers for the vehicle to reach the destination via the route, wherein the aggregate measure of difficulty for each route is determined by the processor based on:
   for each of the plurality of segments for the route, a route segment measure of difficulty based on the product of:
   (a) a lane maneuver difficulty based on a number of lane changes per distance travelled on the route to reach the end of the segment; multiplied by (b) a road condition difficulty based on road surface conditions, including weather conditions affecting visibility and a coefficient of friction affecting tire grip; and
   for each route, adding the route segment measure of difficulty for each of the segments of the route, to thereby calculate the aggregate measure of difficulty for the route; and
   providing instructions for performing a vehicle action, based on the respective aggregate measures of difficulty for the plurality of routes;
   wherein: the vehicle comprises an autonomous vehicle; and
   the processor is further configured to provide instructions for automatically operating the autonomous vehicle to travel to the destination.

8. The vehicle of claim 7, wherein the processor is configured, for each of route of the plurality of routes, to determine the aggregate measure of difficulty also based on a traffic and speed condition for the route, based on a function of traffic congested level, speed limit, and current vehicle speed.

9. The vehicle of claim 7, wherein:
the input device is further configured to receive a second input as to a desired tolerance for difficulty level for travelling of the vehicle; and
the processor is further configured to provide instructions to perform the vehicle action based on the desired tolerance for difficulty level as well as the respective aggregate measures of difficulty for the plurality of routes, such that certain routes of the plurality of routes receive higher priority as compared with certain other routes of the plurality of routes when the certain routes have sufficiently lower travel distance or travel time as compared with the certain other routes, even when the certain routes have higher aggregate measures of difficulty as compared with the certain other routes, provided that the aggregate measures of difficulty of the certain routes is within the desired tolerance of a user of the vehicle as reflected via the second input.

10. The vehicle of claim 9, wherein:
the aggregate measures of difficulty are categorized into three levels of difficulty, namely: easy, medium, and difficult; and
the second input reflects which the following three levels of difficulty, namely, easy, medium and difficulty, are acceptable to the user.

11. The vehicle of claim 7, wherein the processor is further configured to provide a listing of the plurality of routes, along with information as to their respective measures of difficulty.

* * * * *